3,258,407
PROCESSES FOR THE EXTRACTION OF PROTEINS AND OTHER USEFUL CONSTITUENTS CONTAINED IN VEGETABLE TISSUES
Etienne Marié Joseph Blanchon, 85 Avenue de Villiers, Paris 17, France
No Drawing. Filed Dec. 23, 1963, Ser. No. 332,846
Claims priority, application France, Dec. 22, 1962, 919,597, Patent 1,353,515
11 Claims. (Cl. 195—3)

The present invention relates to a process for the extraction of proteins and other useful constituents contained in vegetable tissues, such as, in particular, seeds and oleaginous vegetable tissues.

Various processes are known, for the extraction of the proteins contained in seeds or other oleaginous vegetable tissues, which aim at increasing the protein extraction yield.

These processes are based either on physical methods (such as densimetric tables and various disintegrators) suitable for removing the cellulose, or on chemical methods such as treatments with water, soda, potassium, sodium bicarbonate, borax and dilute mineral acids, to render the proteins soluble, the action of various acids, such as HCl, $H_2SO_4$ or acetic acid, or the action of various bases or of salts of copper, lead, magnesium, iron or calcium or on physico-chemical methods (such as the action of heat or dialysis), to precipitate the proteins rendered soluble.

However, the processes known hitherto for extracting the proteins and other useful constituents contained in vegetable tissues have a serious disadvantage, mainly as regards the coefficient of digestive utilization of vegetable tissues, particularly oleaginous tissues; for these various techniques aim only—in the case of oil-cake, for example—at extracting the proteins, or—in the case of whole oleaginous seeds—at extracting both the oil and the proteins, but are not capable at present of also extracting the other constituents useful for human food or animal feedstuffs, which are also contained in such cake and seeds and which include, more particularly, assimilable glucides, mineral salts, vitamins, oligo-elements and accompanying enzymes.

Now, in all seeds, these nutrients, which are not providers of energy, but are protective and bodybuilding, are localised and placed in reserve in the cortical parts of the seed and are imprisoned, until the time of germination, in cells having their cellulose walls bonded with a pectic cement.

The techniques known hitherto, however, remove the cellulose initially, to increase the yield of protein extracted, and the effect of this is automatically to cause the loss of substances that are of capital value in nutrition, both by virtue of their intrinsic food value and on account of their action on the digestibility of the other constituents in the seed, or even of their action on the digestibility of food intake.

The purpose of the present invention is to provide a process, for the extraction of the proteins and other useful constituents contained in vegetable tissues, better suited to practical requirements than the processes known hitherto for the extraction of proteins from vegetable tissues, in that it makes possible the extraction of all the nutrient principles contained in vegetable tissues such as seeds, and in oleaginous tissues in particular, and in that it affords a considerable improvement in the digestibility of such vegetable tissues as have a high content of indigestible glucide matter, as is the case, for example, with palmetto cake.

According to the present invention, there is provided a process for the extraction of the proteins and other useful constituents contained in vegetable tissues, wherein said vegetable tissues are subjected to the combined enzyme action of pectinolytic, amylolytic and proteolytic enzymes, the effect of which is to liberate the oils, sugars and other water-soluble substances contained in the cellulose cortical cells of the said vegetable tissues, this enzyme action being followed by a separation process intended to remove the residual cellulose waste and by a process for recovering the oils, sugars and other water-soluble substances, as well as the proteins, liberated by the aforesaid enzyme action.

Advantageously, the vegetable tissues are subjected successively to the action of pectinolytic enzymes, then to that of amylolytic enzymes and then to that of proteolytic enzymes.

Preferably, the vegetable tissues are subjected simultaneously to the action of pectinolytic, amylolytic and proteolytic enzymes.

In one favoured method of carrying out the process to which the present invention relates, the combined enzyme action on the vegetable tissues takes place under conditions of pH-value and temperature determined according to the type of enzymes to the action of which the vegetable tissues are to be subjected.

Where the various kinds of enzymes referred to above, namely pectinolytic, amylolytic and proteolytic, are caused to act one after the other, the medium is adjusted at each stage to a pH-value and a temperature which are most favourable to the action of the particular type of enzyme.

Where the vegetable tissues are subjected simultaneously to the action of all the above three types of enzymes, the pH-value and temperature are adjusted so as to permit this simultaneous action to take place in the most favourable possible conditions.

In particular, the invention provides for extracting the proteins and other useful constituents contained in vegetable tissues, as well as the application of these processes to the treatment of seeds—and, in particular, of oleaginous tissues and oil-cake—and the elements suitable for setting up and carrying out these processes and the entirety of such processes as include the said processes for the extraction of the proteins and other useful constituents contained in vegetable tissues.

The invention will be more readily understood with the aid of the following additional description, in which examples are given of the practical application of the process for extracting the proteins and other useful constituents contained in vegetable tissues to which the present invention relates.

These examples are given solely by way of illustration and in no way imply any limitation on its scope.

*Example 1*

The seeds are ground or the cake is pulverised in a hammer mill or by some other means, dry or in water, and the material is then made into a paste by the addition of sufficient quantities of water—five volumes, for example.

This paste is subjected to the action of pectinolytic enzymes. By way of example, one may use preparations rich in pectin-esterases and in pectin-polygalacturonases of bacterial or fungic origin (of the type prepared industrially for clarifying fruit juices). The pH-value is adjusted to 6 and the temperature to 20° C. The amount of dried enzymes (on a neutral carrier) employed is 2 g. per litre of water used in making the paste treated. The duration of the enzyme action is approximately one hour.

At the end of that time, the paste so treated is subjected to the action of an amylolytic enzyme, to render the starch soluble. Again by way of example, one may use an α-amylase (α-glucosidase) of the type used for desizing textiles. The pH-value is maintained at 6 to 6.5 and the temperature is raised to 50° C. The duration of this enzyme treatment is similarly one hour. The amount of enzyme employed should preferably be of the order of 1 g. of dry enzyme per litre of water used for making the paste.

Next, the paste is subjected to the action of proteases. Again, by way of example, one may employ an industrial protease of bacterial origin, such as is customarily used for preserving beer against cold-weather clouding. The pH-value is adjusted to 8.5 and the temperature is brought up to 55° C. The duration of this enzyme action is again one hour. The amount of enzyme employed should preferably be of the order of 2 g. of dry enzyme per litre of water used for making the paste.

The paste is then filtered, the residue is washed and refiltered and the two filtration liquids are added together.

If whole oleaginous products or oil-rich cake are being treated, this liquid is centrifuged so as to separate the oil before the treatment is continued. If oil-separated cake is being treated, this stage may be omitted, since there is no oil to separate.

In either case, after this optional stage, the proteins are precipitated. For this, the pH-value is adjusted to 4.8 by the addition of HCl, for example, or any other suitable means may be adopted. Centrifuging follows, to separate the proteins, and the residue is dried by atomising, for example.

*Example 2*

One proceeds as described in Example 1, but instead of separating the proteins, one sets out to obtain a nutrient containing all the constituents of the end-product. To achieve this, the end-product is dried as if the purpose were to produce dried milk, by concentration and atomising, for example.

*Example 3*

The various enzymes used in three successive stages in Example 1 may be caused to act simultaneously on the vegetable tissues, the conditions as to pH-value, temperature and reaction time being modified.

(a) The actions of the first and second enzyme stages, that is to say the pectinolytic and amylolytic actions, can be carried out simultaneously at a pH-value of 6.5 and a temperature of 37° C. to 40° C. The combined reaction time should be extended to about 1½ hours.

(b) The third enzyme action, that of the proteases, may also be carried out at the same time as the above two—for example, at pH-value of 7 and a temperature of 40° C.—but the duration of the combined enzyme treatment should then be extended to 2¼ hours.

*Example 4*

In another form of the invention, the separation of the oil may take place prior to the action of the proteases.

Here, lipido-protein complexes are formed as a result of this operation. A certain quantity of lipides is thus fixed. For example, in groundnut cake having an oil content of either 0.9% or 4% to 4.5%, according to the extraction method used, no trace of lipide is found, at the end of the operation described in Example 1, in the surface liquid after coagulation of the proteins.

If, therefore, it is desired to obtain the maximum of oil, it is of advantage to separate the oil before subjecting the vegetable tissues to the action of the proteolytic enzymes; and the process described in Example 1 may be applied with advantage where it is desired to obtain the maximum of lipido-protein complexes, either for reasons of nutrition or with a view to their possible use for industrial purposes (manufacture of synthetic textiles or plastics, for example).

*Example 5*

The separation of soluble nitrogenous substances, amino-acids and peptides and other water-soluble substances can be achieved by filtration, after precipitation of the proteins but before drying. This offers a considerable advantage as regards certain applications to alimentary purposes.

TABLE I.—EXPERIMENTAL RESULTS OF THE EXTRACTION OF VEGETABLE TISSUES BY THE PROCESS TO WHICH THE INVENTION RELATES

| Raw material treated | Treatment with acetic acid, mg./g. | Combined enzyme treatment as in the invention, mg./g. |
|---|---|---|
| 1. Groundnut kernels: | | |
| Proteids: | | |
| (a) Insoluble | 0.38 | 2.38 |
| (b) Amino-acids | 0.68 | 3 |
| Glucides | 1.9 | 2.9 |
| 2. Cake, oil-separated by use of solvents: | | |
| Proteids: | | |
| (a) Insoluble | 54 | 125 |
| (b) Soluble: amino-acids plus peptides | 25 | 121.25 |
| Glucides | 1.8 | 5.15 |
| 3. Groundnut bran: | | |
| Proteids: | | |
| (a) Insoluble | 1.63 | 0.028 |
| (b) Soluble (total) | 3.75 | 40.63 |
| Glucides | 5.7 | 6.8 |

TABLE II.—RESULTS OF CHROMATOGRAPHIC TESTS MADE ON OIL-SEPARATED CAKE

| Raw Material | Sugars revealed by Chromatography |
|---|---|
| Oil-separated cake not subjected to the enzyme treatment proposed in the invention. | Fructosans (poorly digestible sugars). |
| Oil-separated cake subjected to the enzyme treatment proposed in the invention. | Fructose plus glucose (both very readily assimilated). |

The foregoing examples show that however the process be carried out and applied, the result is a process for extracting the proteins and other useful constituents from vegetable tissues, the characteristic features of which process are sufficiently evident from the foregoing not to call for additional details.

The process for extracting proteins and other useful constituents from vegetable tissues, as proposed in the present invention, offers real advantages over the extraction processes known hitherto, particularly in that it makes it possible to extract the whole of the nutrient principles contained in vegetable tissues and, in particular, in oleaginous tissues, and to bring about a considerable improvement in the digestibility of vegetable tissues—and of cake in particular—having a high content of indigestible glucide matter.

As will be clear from the foregoing, the invention is in no way limited to such particular applications or methods of carrying it out as have been explicitly described above; on the contrary, all variants can be included without going beyond the scope of the invention as defined in the appended claims.

I claim:

1. A process for the extraction of alimentary values from oil-rich vegetable tissues, which comprises subjecting the said vegetable tissues successively to the action of pectinolytic enzyme, amylolytic enzyme and proteolytic enzyme, and selectively recovering the components liberated by the action of each enzyme at the end of the specific treatment with said enzyme.

2. A process for the extraction of alimentary values from oil-rich vegetable tissues, which comprises first subjecting the said vegetable tissues to the action of pectinolytic enzyme and then, upon completion of the said action, recovering components including oil and pectin liberated by such action; secondly, subjecting the thus-treated vegetable tissue to the action of amylolytic enzyme and then, upon completion of the last-mentioned action, recovering components including oil and starches liberated by such action; and thirdly, subjecting the thus-treated vegetable tissue to the action of proteolytic enzyme and then, upon completion of the action of the proteolytic enzyme, recovering components including residual oil and proteids liberated by such action.

3. A process according to claim 2, wherein the action of the pectinolytic enzyme is effected at a pH of 6.

4. A process according to claim 2, wherein the action of the pectinolytic enzyme is effected at a temperature of about 20° C.

5. A process according to claim 2, wherein the concentration of pectinolytic enzyme is of the order of 2 grams per liter.

6. A process according to claim 2, wherein the action of the amylolytic enzyme is effected at a pH of 6 to 6.5.

7. A process according to claim 2, wherein the action of amylolytic enzyme is effected at a temperature of about 50° C.

8. A process according to claim 2, wherein the concentration of amylolytic enzyme is of the order of 1 gram per liter.

9. A process according to claim 2, wherein the action of the proteolytic enzyme is effected at a pH of 8.5.

10. A process according to claim 2, wherein the action of the proteolytic enzyme is effected at a temperature of about 55° C.

11. A process according to claim 2, wherein the concentration of proteolytic enzyme is of the order of 2 grams per liter.

References Cited by the Examiner

UNITED STATES PATENTS

| 2,486,385 | 11/1949 | Beckman | 195—3 |
| 2,676,888 | 4/1954 | Westfall | 99—17 |
| 2,680,688 | 6/1954 | Moulton | 99—106 X |
| 3,083,104 | 3/1963 | Celmer | 99—103 |
| 3,157,513 | 11/1964 | Allen et al. | 99—17 |

OTHER REFERENCES

Sumner et al.: "Chemistry and Methods of Enzymes, 1953, pp. 116–120, and 128–129.

A. LOUIS MONACELL, *Primary Examiner.*

L. M. SHAPIRO, *Assistant Examiner.*